United States Patent Office 2,795,566
Patented June 11, 1957

2,795,566
RESINOUS COMPOSITION

Gennady M. Kosolapoff, Auburn, Ala., assignor to Monsanto Chemical Company, St. Louis, Mo., a corporation of Delaware No Drawing. Original application June 23, 1951, Serial No. 233,257, now Patent No. 2,720,535, dated October 11, 1955. Divided and this application July 21, 1955, Serial No. 523,625

2 Claims. (Cl. 260—30.6)

The present invention relates to organic compounds of phosphorus and more particularly provides the hitherto unknown bis(2-ethylhexyl) benzylphosphonate and vinyl chloride polymers plasticized with the new compound. Bis(2-ethylhexyl) benzylphosphonate has the structure

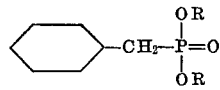

in which R is the 2-ethylhexyl radical.

It is readily prepared by condensing a benzyl halide, e. g., benzyl bromide or benzyl chloride with an alkali metal bis(2-ethylhexyl) phosphite, the condensation proceeding with formation of alkali halide and the phosphonate. The reaction is effected simply by heating a mixture of the two reactants at moderately increased temperatures and advantageously at the refluxing temperature of a solution of the benzyl halide and the phosphite in an inert solvent until formation of the phosphonate has occurred. Phosphites which may be employed include sodium, potassium, and lithium bis(2-ethylhexyl) phosphites. As solvents there may be employed liquid media which are unreactive under the conditions employed, e. g., xylene, toluene, hexane, petroleum spirits, ethyl ether, isopropyl ether, etc.

Since the reaction proceeds by condensation of one mole of the phosphite with 1 mole of the halide, equimolar proportions of these reactants may be employed in the initial reaction mixture. However, inasmuch as either the bis(2-ethylhexyl) phosphite or the benzyl halide may be recovered from the final reaction mixture the proportion of the halide and of the phosphite in the initial reaction mixture is immaterial.

Bis(2-ethylhexyl) benzylphosphonate is a stable, highly viscous, substantially colorless liquid which may be used for a variety of industrial purposes and is particularly valuable as a plasticizer for vinyl chloride polymers. The present phosphonate imparts increased flexibility to vinyl chloride polymers, which flexibility is retained at very low temperatures.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition. We have found that very good flexibility is imparted to vinyl chloride polymers when the present products are employed as plasticizers for such polymers.

The phosphonate is a valuable plasticizer for polyvinyl chloride and copolymers of at least 70 percent by weight of vinyl chloride and up to 30 percent by weight of an unsaturated monomer copolymerized therewith, for example, vinyl acetate, vinylidene chloride, etc. The present compounds impart great flexibility to vinyl chloride polymers at very low temperatures; they are compatible with such polymers, and show no exudation of plasticizer even at plasticizer content of up to 50 percent.

Although the quantity of plasticizer will depend upon the particular polymer to be plasticized and upon its molecular weight, it is generally found that compositions having from 5 to 50 percent by weight of plasticizer will, in most cases, be satisfactory for general utility. The good flexibility of the plasticized compositions increases with increasing plasticizer concentration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature, the flexibility of these compositions at a low temperature may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the "American Society for Testing Materials" under the designation D–744–44T.

This invention is further illustrated, but not limited, by the following examples:

EXAMPLE 1

102 grams (⅓ mole) of bis(2-ethylhexyl) phosphite was reacted with 7.6 g. of sodium in 500 cc. of xylene, the resulting solution of sodium bis(2-ethylhexyl) phosphite was treated in the cold with 43 g. of benzyl chloride, and the whole was then refluxed for 16 hours. The sodium chloride which had formed in the reaction mixture was removed by washing with hot water, and the residue was filtered and distilled to yield 85 g. of the substantially pure bis(2-ethylhexyl) benzylphosphonate, B. P. 198–201° C./2.5 mm., $n_D^{25}$ 1.4758.

EXAMPLE 2

60 parts of polyvinyl chloride and 40 parts by weight of the phosphonate of Example 1 were mixed on a rolling mill to a homogeneous blend. During the milling substantially no fumes or discoloration were observed. A molded sheet of the mixture was clear, transparent and substantially colorless. Testing of the molded sheet by the procedures described above gave a low temperature flexibility value of minus 49.5° C., which value denotes extremely good low temperature properties. Tests on the volatility characteristics of the plasticized composition gave a volatility value of 8.5 percent. When subjected to a heat of 225° F. for a period of 30 minutes, the clarity and color of the molded product were substantially unchanged.

While the above example shows a composition in which the ratio of plasticizer to polymer content is 40:60, the content of phosphonate to polyvinyl chloride may be widely varied, depending upon the properties desired in the final product. For many purposes a plasticizer content of, say, from only 10 percent to 20 percent is preferred. The present phosphonate is compatible with polyvinyl chloride over wide ranges of concentrations, up to 50 percent of ester, based on the total weight of the plasticized composition, yielding desirable products.

The plasticized polyvinyl halide composition of the present invention has good thermal stability; however, for many purposes it may be advantageous to use known stabilizers in the plasticized composition. Inasmuch as the present phosphonate is substantially unreactive with the commercially available heat and light stabilizers which are commonly employed with polyvinyl chloride or copolymers thereof, the presence of such materials in the plasticized products does not impair the valuable properties of the present ester. The phosphonate is of general utility in softening vinyl chloride polymers. It may be used as the only plasticizing component in a compounded vinyl chloride polymer or it may be used in conjunction with other plasticizers.

This application is a divisional application of my copending application, Serial No. 233,257, filed June 23, 1951.

What is claimed is:

1. A resinous composition comprising polyvinyl chloride plasticized with bis(2-ethylhexyl) benzylphosphonate.

2. A resinous composition comprising polyvinyl chloride plasticized with bis(2-ethylhexyl) benzylphosphonate, said phosphonate being from 5 percent to 50 percent by weight of the composition.

No references cited.